United States Patent [19]

Bellanger et al.

[11] Patent Number: 4,817,499
[45] Date of Patent: Apr. 4, 1989

[54] TRACTOR HITCH CONTROL SYSTEM

[75] Inventors: Regis Bellanger, Rimbard, France; William J. Graaskamp, Guelph, Canada

[73] Assignee: Massey-Ferguson Services N.V., Curacao, Australia

[21] Appl. No.: 60,294

[22] Filed: Jun. 10, 1987

[30] Foreign Application Priority Data

Jun. 14, 1986 [GB] United Kingdom ............... 8614522
Jun. 14, 1986 [GB] United Kingdom ............... 861523

[51] Int. Cl.⁴ .......................................... F15B 13/16
[52] U.S. Cl. ...................................... 91/361; 91/459; 172/2; 318/563; 318/646
[58] Field of Search ............... 91/361, 362, 459; 172/2, 3, 4, 7, 9, 10; 318/563–599, 604, 609, 646, 663; 361/92, 95, 100

[56] References Cited

U.S. PATENT DOCUMENTS

| 3,570,243 | 3/1971 | Comer et al. | 91/361 X |
|---|---|---|---|
| 3,821,625 | 6/1974 | Scholl | 91/361 X |
| 4,306,314 | 12/1981 | Griffiths | 455/603 |
| 4,363,068 | 12/1982 | Burns | 361/91 |
| 4,437,295 | 3/1984 | Rock | 172/4 X |
| 4,441,136 | 4/1984 | Hampshire | 361/88 |
| 4,571,500 | 2/1986 | Mucheyer | 172/10 X |
| 4,585,205 | 4/1986 | Coppola et al. | 91/361 X |
| 4,658,908 | 4/1987 | Hannukainen | 172/10 |

FOREIGN PATENT DOCUMENTS

| 66380 | 12/1982 | European Pat. Off. . |
|---|---|---|
| 108347 | 5/1984 | European Pat. Off. . |
| 151322 | 8/1985 | European Pat. Off. . |
| 131711 | 1/1986 | European Pat. Off. . |
| 2916322 | 11/1980 | Fed. Rep. of Germany . |
| 3338764 | 5/1985 | Fed. Rep. of Germany . |
| 2548840 | 1/1985 | France . |
| 2037102 | 7/1980 | United Kingdom . |

OTHER PUBLICATIONS

"Dial and Switch Implement Hitch", Power Farming, 9/82.
"Le Relevage Electronique Sur Les Tracteurs", Motorisation et Technique Agricole, 5/86.

Primary Examiner—Robert E. Garrett
Assistant Examiner—Mark A. Williamson

[57] ABSTRACT

An electronic tractor hitch control system in which the position of an implement hitch relative to a tractor can be set using a main control operable by a tractor operator from his normal location on the tractor and can also be set using a secondary control located at a location remote from the normal operator's location, such as on the rear of the tractor fenders. The system is arranged so that any implement position signal set using the secondary control is opposed by a smaller hitch positioning signal generated within the system so that the speed of movement of the hitch in response to hitch positions set using the secondary control is moderated. The system also includes circuitry for detecting short circuits in parts of the system located in vulnerable locations.

12 Claims, 5 Drawing Sheets

TRACTOR HITCH CONTROL SYSTEM

This invention relates to tractor hitch control systems and in particular is concerned with arrangements for permitting the position of a tractor hitch to be controlled by a tractor operator standing in a position remote from the operator's normal operating location. For example, many tractors are currently fitted with arrangements for enabling an operator to control the position of the hitch whilst standing to the rear of the tractor during the coupling-up of an implement.

Difficulties can arise with such arrangements in that the control system may respond too suddenly and too fast when an operator operates a control to adjust the position of the hitch whilst standing to the rear of the tractor and there is a consequent risk that the operator may be injured.

It is an object of the present invention to provide a tractor hitch control system in which the above problem of sudden response is mitigated.

Thus according to the present invention there is provided a tractor hitch control system for the control of the position of an implement hitch relative to a tractor using an actuator connected between the hitch and tractor, the system comprising:

main control means operable by a tractor operator from his normal operator's location on the tractor for the setting of a desired value of an operating parameter of the tractor and/or hitch, sensing means for sensing the actual value of the operating parameter, comparator means for comparing the desired and actual values of the operating parameter to provide an error signal, processing means for processing the error signal to provide an actuating signal to control the actuator thereby moving the hitch so as to tend to reduce the error signal to zero, and secondary control means positioned at a location remote from the normal operator's location to allow the operator to initiate a signal to adjust the position of the hitch when at said remote location, the system being characterised in that any signal from the secondary control means is opposed by a smaller hitch positioning signal generated with the control system so that the speed of movement of the hitch in response to signals from the secondary control means is moderated.

The invention has particular applicability to electrical hitch control systems in which one or more solenoid-operated fluid-flow control valves are used to control the supply of fluid to and the exhausting of fluid from one or more lift cylinders which raise and lower the hitch. Such electrical control systems may use the so-called "pulse width modulation" (PWM) technique for controlling the solenoid valve or valves in which the signal applied to the valve or valves is oscillation "on" and "off" and the relative durations of the "on" and "off" periods are used to determine the valve openings used to supply fluid to or exhaust fluid from the lift cylinders. In such arrangements the solenoid-operated valve or valves are seldom if ever fully open so that the movement of the hitch is not erratic and liable to large sudden movements when operating using the PWM technique.

When arranging for such a hitch control system to have a secondary control means, positioned say at the rear of the tractor, the secondary control means may be provided in the form of a pair of switches located adjacent the rear of the tractor, one switch when operated being arranged to supply a continuous signal to the valve or valves to raise the hitch and the other switch when operated being arranged to supply a continuous signal to lower the hitch.

Applying the present invention to the arrangement described in the preceeding paragraph it will be observed that, for example, when the secondary control means is operated to provide a continuous raise signal, which would result in the solenoid valve being continuously maintained fully open with the consequent sudden and fast upward movement of the hitch, the control system will generate a smaller opposing lowering signal using the PWM technique which will reduce the effective raise signal and hence moderate the speed of movement of the hitch in response to the raise signal from the secondary control means.

Preferably the PWM signal generated by the control system to oppose the signal from the secondary control means will be adjusted by the control system during the operation of the secondary control means in order to try to maintain a given speed of movement of the hitch. For example, the system will try to maintain a speed of movement of the hitch equivalent to a time of 8 to 10 seconds for the movement of the hitch through its full range of travel (i.e. from the ground engaging position to its transport position). If at a given instant a PWM signal level of say 40 percent, [i.e. the PWM is 40 percent "on" 60 percent "off"] is being generated during the operation of the secondary control means to raise the hitch this would result in an effective raise signal of $100-40=60$ percent being applied to the valve.

The control system may be arranged so that, for example, when a predetermined amount of movement has occurred in response to the operation of a switch the PWM unit generates a 100 percent signal in opposition to the switch signal so further movement of the hitch is prevented.

The actuator may be controlled by a solenoid-operated fluid flow control valve in an electrical control circuit including a primary semiconductor which is rendered conductive in response to the actuating signal to activate the valve, said electrical control circuit including means for checking the potential drop across the primary semiconductor when the semiconductor is rendered conductive in order to detect any short circuit between the semiconductor and the valve, and means for maintaining the semiconductor conductive whilst the actuating signal is applied and the potential drop indicates no short and for turning the semiconductor off if the potential drop indicates a short between the semiconductor and the valve.

The means for checking the potential drop across the primary semiconductor may comprise a second semiconductor connected to the voltage level on the valve side of the primary semiconductor, said voltage level changing hen a short circuit occurs and thus switching the second semiconductor between its conductive and non-conductive states which in turn switches the primary semiconductor to its non-conductive state.

The primary semiconductor may comprise a field effect transistor.

The invention also provides and electrical control circuit including a primary semiconductor which is rendered conductive in response to a given signal in order to activate a component in the circuit, the circuit being characterised by including means for checking the potential drop across the semiconductor when the semiconductor is rendered conductive in order to detect any short circuit between the semiconductor and the component, and means for maintaining the semiconductor conductive whilst the signal is applied and the potential drop indicates no short and for turning the semiconductor off if the potential drop indicates a short between the semiconductor and the component.

One embodiment of the present invention will now be described, by way of example only, with reference to accompanying drawings in which.

Figure 1:
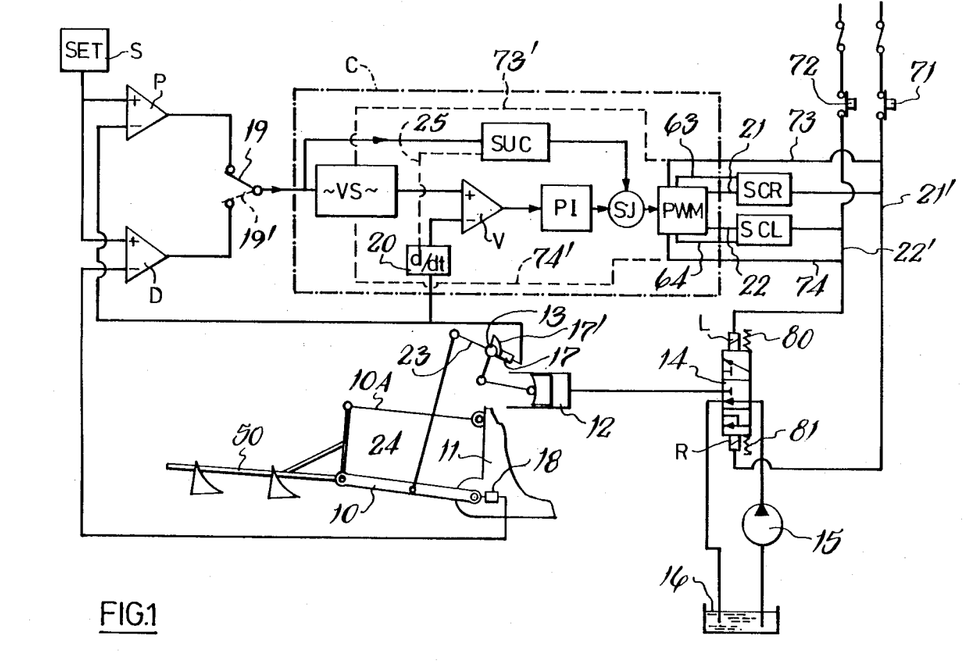
FIG. 1 is a diagrammatic representation of a tractor hitch control system embodying the present invention.

Referring to FIG. 1 the tractor hitch comprises a pair of draft links 10 (only one of which is shown in FIG. 1) and a top link 10A which are pivotted on to the rear of a tractor main housing 11. The hitch supports a soil engaging implement which in the example chosen is a mould board plough 50. The position of the draft links 10 relative to the housing 11 is controlled by a hydraulic ram 12 which is connected with the draft links 10 via a conventional rotatable cross-shaft 13 which carries a pair of lift arms 23 and lift rods 24.

The control system is designed to control the rotational movement of the cross-shaft 13 thus controlling the position of the associated draft links 10.

The control of the supply of pressurised hydraulic fluid to the ram 12 and the venting of hydraulic fluid from the ram is effected by a solenoid operated spool valve 14 which is supplied with pressurised fluid by a pump 15 and which vents fluid to reservoir 16.

In the system shown in FIG. 1 the movement of the cross-shaft 13 and hence the draft links 10 is arranged to be controlled in accordance with values of the parameters of "hitch position" and "draft force" imposed on the hitch. The desired value of the hitch position or draft force is set by the operator using the setting means S which may conveniently comprise a rotary or linear potentiometer. This set value is fed to one input of a hitch position comparator P and a draft force comparator D. The other input of position comparator P is fed with the actual position of the cross-shaft 13 using a position sensor 17 which contacts a cam 17′ which rotates with shaft 17. The other input of the draft force comparator D is fed with the actual draft force imposed on the draft links 10 by the implement from a draft force sensor 18. It will be appreciated that the position sensors 17 and draft force sensor 18 may be of any suitable type which is capable of providing an electrical signal proportional to either hitch position or draft force and may be arranged to act on any component which either moves with the hitch or is subjected to draft force.

When the control system is to operate in accordance with the hitch position parameter, switch 19 is set in the position shown in FIG. 1 and the position error emerging from position comparator P is fed to the remainder of the control system. Similarly when the control system is to operate in accordance with the draft force parameter the switch is moved to the dotted line position 19′ thus connecting the draft force error signal leaving comparator D to the remainder of the control system.

The error signal emerging from comparator P or D is required to be processed to provide a control signal to operate either the raise solenoid R or the lower solenoid L of valve 14 depending on the value and sign of the error signal and any suitable processing arrangement may be chosen.

In the example described the error signal is processed by the control system arrangement described and claimed in the Applicants earlier co-pending UK Patent Application No. 8706908 (which claims priority from UK Application No. 8608194) and which is contained within the dotted-line box C in FIG. 1.

Figure 2:
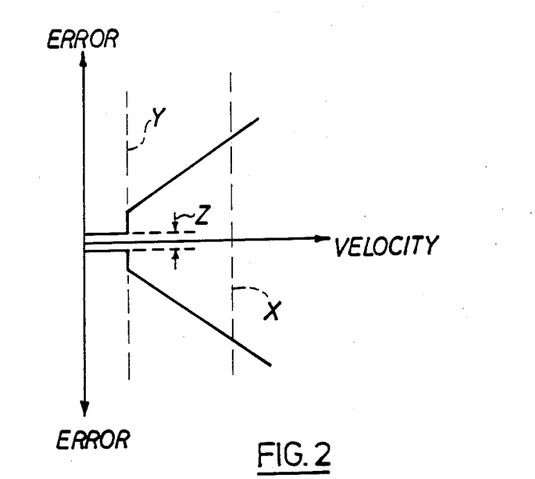
FIG. 2 is a curve showing the variation of set velocity with the control parameter of the system.

Basically the control system within box C includes a velocity setting function VS which sets in effect a rotational velocity for the cross-shaft 13 which is dependent on the magnitude of the position or draft force error in accordance with the curve shown in FIG. 2. Thus the larger the error the greater the set velocity within maximum and minimum velocity values shown, for example by lines X and Y in FIG. 2. Typically the maximum and minimum velocity values X and Y are say 43 cm/sec and 5 cm/sec respectively. As can be seen from FIG. 2 the error signal has a deadband Z within which no corrective action is taken.

The output of the velocity setting function VS is fed to one input of a velocity comparator V. The other input of comparator V received signals from a differentiator 20 which differentiates the position signal from sensor 17 with respect to time to provide a signal proportional to the actual velocity of cross-shaft 13. The output of comparator V is processed by a proportional-/integral control designated PI in FIG. 1 and this processed signal is then fed to a pulse width modulation unit designated PWM in FIG. 1 via a summing junction SJ. This PWM unit, dependent on the value and sign of the signal from comparator P or D and the PI control, issues signals via line 21 to oscillate the "raise" solenoid R of valve 14 in order to supply pressurised fluid to ram 12 and thus raise the draft links 10 or may supply signals via line 22 to oscillate the "lower" solenoid L of valve 14 thus connecting the ram 12 to reservoir 16 and thus allowing the draft links 10 to lower under gravity. If there is no error signal eminating from the operative comparator P or D then the PWM modulating unit will not issue signals via line 21 nor via line 22 and the valve 14 will be locked in its central neutral position, as shown in FIG. 1, thus locking the draft links 10 in their current position.

Thus with the tractor implement control system described above, the operator can, for example, set the switch in the figure shown in FIG. 1 and thus opt to control the position of the draft links 10 in accordance with the desired position set on the setting means S. When operating in this so-called "position control" mode the position error signal is fed via switch 19 to the velocity setting function VS. As indicated above, the larger the position error the higher will be the velocity set by unit VS. Velocity comparator V provides a velocity error signal by comparing the set velocity from unit VS with the actual cross-shaft velocity from differentiator 20. This velocity error signal is processed in the PI control unit and an appropriate raise or lower signal is transmitted to the appropriate solenoid of valve 14 so as to tend to reduce both the velocity and the position errors to zero. Once the position error from comparator P is within deadband Z no further corrective action is applied by the PWM unit and the valve 14 is thus held locked in its neutral position until the next position error is detected whereupon the process is repeated.

It will be appreciated that the control system can operate in the so-called "draft control" mode by moving the switch to position 19'. The system operates in exactly the same manner as described above except that the velocity setting function VS sets velocities dependent on the draft-force error from comparator D and no further corrective action is applied once the draft force error signal is within deadband Z.

The system is also provided with a start-up control function designated SUC in FIG. 1 which is the subject of the Applicants previously referred to UK Application No. 8706908 and which receives the error signal from either the position comparator P or the draft comparator D and provides signals to the PWM unit via summing junction SJ.

If, for example, the system is operating in position control mode, as shown by the position of switch 19 in FIG. 1, each time the system detects the presence of a position error from comparator P outside the deadband Z the start-up control unit issues a signal to the PWM unit to send a start-up signal (represented at AO in FIG. 3) to operate either the raise or lower solenoid of valve 14 dependent on the sign of the position error signal.

The magnitude of signal AO (which represents a given PWM value) is arranged to be just slightly less than expected to be necessary to produce movement of cross-shaft 13 (this minimum signal level is easily determined by the system designer when testing prototype systems). If as a result of applying the start-up signal AO no velocity signal is obtained from differentiator 20 (indicating that the cross-shaft 13 has not moved) the magnitude of the start-up signal is increased (in the example described in a linear manner using fast integration as shown by portion B of FIG. 3) until a signal is obtained from a differentiator 20 (see point C in FIG. 3) thus indicating that the cross-shaft 13 has begun to move. Typically point C occurs at say 150 ms whilst the PWM frequency is say 60 HZ or a period of 16 ms.

Figure 3:
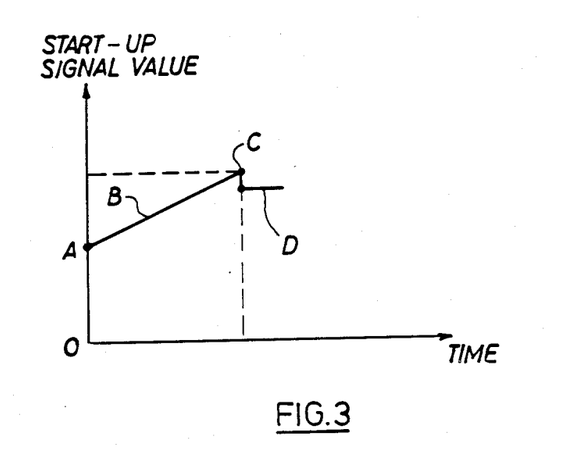
FIG. 3 is a curve showing the build-up with time of a start-up signal applied by the system.

The emergence of the velocity signal from the comparator 20 is arranged to switch out the start-up control function so that control of the further movement of cross-shaft 13 is dependent solely on the velocity error signals from comparator V which are processed by the PI control system as indicated by portion D of FIG. 3. Portion D of FIG. 3 is at a slightly lower level than point C to take account of the tendency of the spool of valve 14 to lag behind the signal applied to the valve by the PWM unit. This datum signal level D is held in the SUC function during the correction of a given position error and used as the datum relative to which the PWM unit operates during the correction of that particular position error. This switching out of the SUC unit is shown diagrammatically in FIG. 1 by dotted line 25 connecting the differentiator 20 and the SUC unit.

As will be appreciated, the initial application of the start-up signal AO to the appropriate solenoid of valve 14 significantly increases the speed of response of the control system to the appearance on each position error signal since the rate of increasing the valve control signal is greater than that which can be obtained from PI control alone.

The performance of the system is still further improved by arranging the start-up control function to store the magnitude of the start-up signal necessary to produce an actual velocity signal from comparator 20 at the commencement of each correction of a position error. This stored value of start-up signal may then be used to adjust the level subsequently applied start-up signals in subsequent position error corrections.

Figure 5:
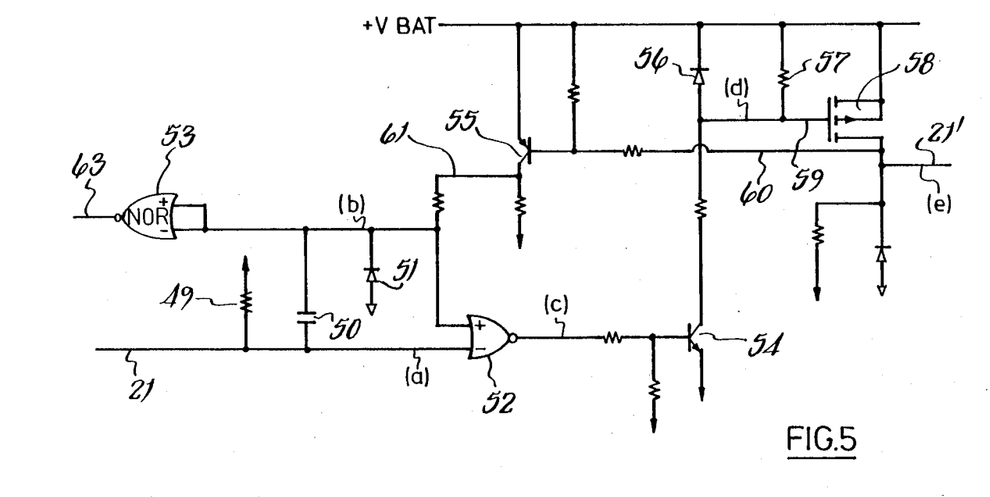
FIG. 5 shows the short-circuit protection portion of the system of FIG. 1 in more detail.

The system also includes identical short-circuit protection and driver circuits SCR and SCL incorporated in lines 21 and 22 which connect the PWM unit to the raise and lower solenoids R and L respectively. Details of the short circuit protection circuit SCR for the raise solenoid are shown in FIG. 5. The purpose of the SCR circuit and the corresponding SCL circuit is to detect short circuits in the wiring 21' and 22' which connects the SCR and SCL circuits to their respective solenoids R and L. As previously indicated this wiring is frequently in exposed locations and is therefore prone to damage and consequent short-circuiting.

Figure 6:
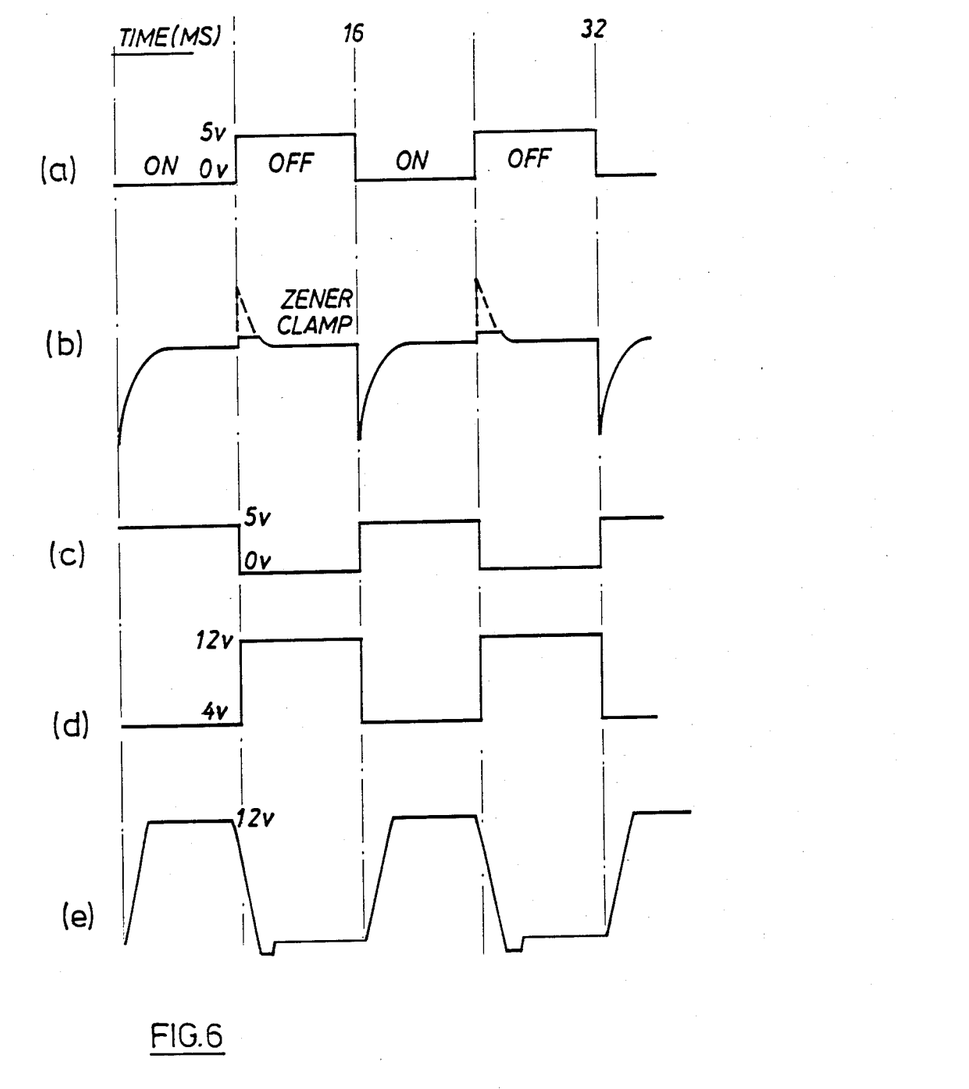
FIG. 6 shows the voltage/time curves at various locations (a), (b), (c), (d) and (e) in the circuit of FIG. 5.

Referring to FIGS. 5 and 6 the SCR circuit, which operates using negative logic, includes a resistor 49, a capacitor 50, a zener diode 51, NOR gates 52 and 53, npn transistor 54, pnp transistor 55, zener diode 56, resistor 57 and field effect transistor (FET) 58.

As described above, line 21 receives the signal for the raise solenoid R from the PWM unit. As the SCR circuit employs negative logic an "on" signal to the raise solenoid R corresponds to a zero volt (or zero logic) signal on line 21 and on "off" signal corresponds to a 5 volt (or logic 1) signal on line 21.

Thus if the PWM unit is giving an "on" signal the voltage on line 21 and hence at the negative input of NOR gate 52 will be zero volts. The typical voltage on line 21 during the "on" and "off" periods is shown diagrammatically in FIG. 6 at (a). The imposition of the zero volt signal on line 21 generates a negative voltage spike at capacitor 50 (see the voltage form shown at (b) in FIG. 6) which is passed to the positive input of NOR gate 52.

Thus momentarily both inputs to gate 52 receive negative inputs and the gate therefore passes a logic 1 or 5 volt signal (see the voltage form at (c) in FIG. 6) to the base of transistor 54 to render the transistor conductive. This current flow through transistor 54 gives a voltage drop across resistor 57 which in combination with the zener 56 clamps the voltage on the base line 59 of FET 58 (see the voltage form at (d) in FIG. 6 at 4 volts thus rendering the FET 58 conductive which switches line 21' to the battery voltage (see the voltage form at (e) in FIG. 6) to actuate the raise solenoid R.

The battery voltage at line 21' is communicated via line 60 to the base of transistor 55 and thus switches off the transistor to give zero volts at line 61 which is communicated to the positive input of the NOR gate 52. Thus during each "on" period, providing a short circuit does not occur, both the inputs to the NOR gate 52 continue to be connected to a zero volt signal to maintain the FET conductive. This zero volt signal is also communicated to both inputs of NOR gate 53 via line 62 to produce a logic one or 5 volt signal at line 63 which signals to the PWM unit that the raise solenoid is responding to the raise signal at line 21.

Looked at another way, at the commencement of each "on" period the system tests for a short circuit in line 21' by effectively measuring the potential drop across FET 58 and uses the potential drop across the FET 58 to switch on and off the transistor 55 to vary the logic inputs to NOR gate 52 and thus in turn switch the FET between its conductive and non-conductive states. The initial logic inputs necessary at NOR gate 52 to conduct this test are ensured by the generation of the short duration negative spike from capacitor 50 as described above. If no short circuit exists the necessary negative input is then maintained by the system in the manner described above during the remainder of each "on" period.

If a short circuit occurs the voltage at line 21' drops to zero. This in turn switches on the transistor 55 via line 60 which gives a 5 volt or logic 1 signal at line 61 which in turn results in NOR gates 52 and 53 giving a logic zero signal. The logic zero signal from NOR gate 52 switches off transistor 54 which raises the voltage at line 59 back to the battery voltage and thus renders the FET 58 non-conductive thus preventing damage to the FET. The switching off of the FET drops the voltage on line 21' to zero and deactivates the raise solenoid R.

The logic 1 signal from the NOR gate 53 which is communicated to the PWM unit via line 63 indicates that the raise solenoid is no longer operative.

As will be appreciated, when the PWM is issuing an "off" signal a 5 volt or logic 1 signal is applied to line 21 (see voltage form (a) in FIG. 6). Since NOR gate 52 only gives a 5 volt or logic 1 signal to the base of transistor 54 when both inputs receive a zero volt signal, when an "off" signal is applied to line 21 transistor 54 is turned off which in turn renders FET 58 non-conductive so that the voltage at lines 21' and 60 drops to zero so that the raise solenoid R is not activated and the transistor 55 is switched on to give a 5 volt or logic 1 signal to lines 61 and 62 so that a logic zero output emerges from NOR gate 53 indicating the the raise solenoid R is not activated.

The short circuit protection circuit SCL associated with the lower solenoid L responds in a similar manner to the SCR circuit described above to the "on" and "off" signal at line 22 and any short circuit which may occur in line 22'. Line 64 operates as the equivalent of line 63 in FIG. 4 and indicates to the PWM unit when the lower solenoid is activated.

As can be seen from FIG. 1 in accordance with the present invention button-type switches 71 and 72 are provided in lines 21' and 22' respectively. These switches are located on the rear of the tractor, for example on the rear of the tractor wheel fenders, to enable the tractor operator to raise the hitch by pressing switch 71 and to lower the hitch by pressing switch 72.

Figure 4:
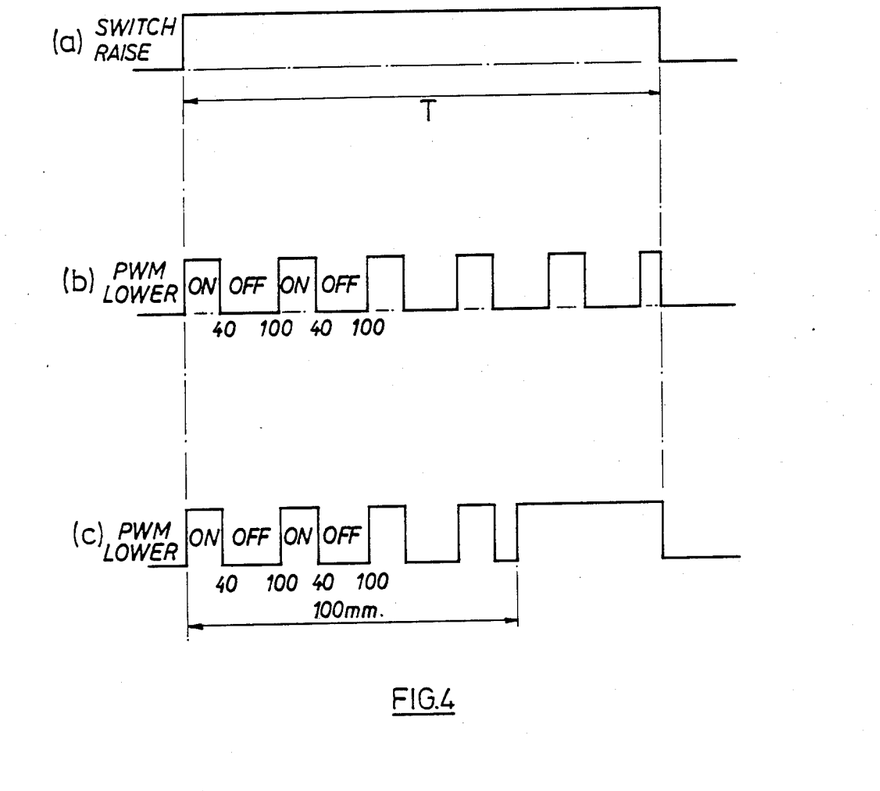
FIG. 4 shows voltage/time curves for the signals generated by the operator's switch and the PWM unit when the rear mounted switches are operated.

The operation of the button switches 71 and 72 is basically as follows. If, for example, the operator presses the "raise" button 71 to actuate raise solenoid R for a time period T this results in a full 100% raise signal being sent to the raise solenoid (see FIG. 4a). This fact is communicated to the PWM unit by line 73 and to the velocity setting function VS by dotted line 73' and results, as will be described below, in the generation of a PWM signal which is sent to the lower solenoid L to oppose the raise signal.

On operation of button switch 71 the velocity setting function VS generates a preset velocity signal corresponding to a speed of movement of the hitch equivalent to a time of say 8 to 10 seconds for movement of the hitch through its full range of movement.

The above preset hitch velocity from the velocity setting function VS is fed to comparator V which also receives the actual hitch velocity from differential 20. The velocity error emerging from comparator V is processed by the PI unit and the PWM unit issues a signal to the lower solenoid L dependent on the velocity error. Thus the value of the PWM signal issued to the lower solenoid L is continually adjusted during the operation of the switch 71 to ensure that the speed of upward movement of the hitch is maintained at or around the level corresponding to the present signal from the VS function.

For example, if at a given instant during the operation of button 71 a PWM signal of say 40 percent (see FIG. 4b) is being issued to the lower solenoid L this would result in an effective raise signal of 100−40=60 percent being applied to the valve so that the speed of movement of the hitch in response to the operation of switch 71 is therefore moderated.

In a similar manner operation of the "lower" button 72, which is communicated to the PWM unit by line 74 and to the VS function by line 74', results in the PWM unit issuing a signal to the raise solenoid R which is again continually adjusted to ensure a speed of downward movement of the hitch at or around the level corresponding to the preset signal from the VS function.

This generation of an opposing signal by the PWM unit in response to each operation of the buttons 71 and 72 ensures that the speed of movement of the hitch is not too fast and thus the danger of the operator being injured whilst standing close to the hitch when operating buttons 71 and 72 is avoided.

FIG. 4(c) illustrates an alternative mode of operation of the system in which when, say, the switch 71 is operated the PWM unit issues a lower signal to solenoid L (as described above) until the system detects that the hitch has been raised by, say, 100 mm whereupon the PWM unit is arranged to generate a full 100% "lower" signal to nullify the 100% raise signal from the button 71 so that the valve 14 is centered by springs 80 and 81 and further movement of the hitch is stopped no matter how long the operator maintains the switch 71 depressed. Thus for each operation of switch 71 the maximum raise distance which can be acheived is 100 mm which is an additional safety feature. Similarly a movement limit can be imposed on each operation of the lowering switch 72.

A further advantage of the provision of switches 71 and 72 is that they provide a separate means for controlling the hitch so that if the control system C should fail it will still be possible to raise or lower the hitch using buttons 71 and 72 although of course the response to buttons 71 and 72 will be more jerky since the above described moderating effect of the PWM unit will be absent. Thus if, for example, the control system C were to fail whilst the tractor was actually ploughing it would be possible for the operator to raise the plough out of the ground using button 71 and then limp home for repairs to the system. Without such a capability the tractor would be unable to leave the field since it would not be possible to raise the plough out of the ground.

What is claimed:

1. A tractor hitch control system for the control of the position of an implement hitch relative to a tractor using an actuator connected between the hitch and tractor, the system comprising:

main control means operable by a tractor operator from his normal operator's location on the tractor for the setting of a desired value of an operating parameter of the tractor and/or hitch, sensing means for sensing the actual value of the operating parameter, comparator means for comparing the desired and actual values of the operating parameter to provide an error signal, processing means for processing the error signal to provide an actuating signal to control the actuator thereby moving the hitch so as to tend to reduce the error signal to zero, and secondary control means positioned at a location remote from the normal operator's location to allow the operator to initiate a signal to adjust the position of the hitch when at said remote location, the system being characterized in that any signal from the secondary control means is opposed by a smaller hitch positioning signal generated within the control system so that the speed of movement of the hitch in response to signals from the secondary control means is moderated.

2. A control system according to claim 1 characterized in that the opposing signal generated by the control system is adjusted to try to maintain a given speed of movement of the hitch during operation of the secondary control means.

3. A control system according to claim 1 characterized in that after a predetermined amount of hitch movement has occurred in response to a given operation of the secondary control means the opposing signal is adjusted to cancel out the signal from the secondary control means to prevent further movement of the hitch thus limiting the maximum movement of the hitch which can occur in response to any given individual operation of the secondary control means.

4. A control system according to claim 1 in which a solenoid-operated fluid-flow control valve means is used to control the hitch actuator, the system being characterized in that the processing means includes pulse width modulation means which issues the actuating signal for the solenoid operated control valve means and provides the opposing signal.

5. A control system according to claim 1 characterized in that the secondary control means is capable of initiating movement of the hitch should the control system suffer a failure making it unable to produce an actuating signal or opposing signal.

6. A control system according to claim 1 characterized in that the actuator is controlled by a solenoid-operated fluid flow control valve in an electrical control circuit including a primary semiconductor which is rendered conductive in response to the actuating signal to activate the valve, said electrical control circuit including means for checking the potential drop across the primary semiconductor when the semiconductor is rendered conductive in order to detect any short circuit between the semiconductor and the valve, means for maintaining the semiconductor conductive whilst the actuating signal is applied and the potential drop indicates no short and for turning the semiconductor off if the potential drop indicates a short between the semiconductor and the valve.

7. A control system according to claim 6 characterized in that the means for checking the potential drop across the primary semiconductor comprises a second semiconductor connected to the voltage level on the valve side of the primary semiconductor, said voltage level changing when a short circuit occurs and thus switching the second semiconductor between its conductive and non-conductive states which in turn switches the primary semiconductor to its non-conductive state.

8. A control system according to claim 7 characterized in that the second semiconductor comprises a pnp transistor and in that said voltage level on the component side of the primary semiconductor is connected to the base of the pnp transistor.

9. A tractor hitch control system for the control of the position of an implement hitch relative to a tractor using an actuator connected between the hitch and tractor, the system comprising:

main control means operable by a tractor operator from his normal operator's location on the tractor for the setting of a desired value of an operating parameter of the tractor and/or hitch, sensing means for sensing the actual value of the operating parameter, comparator means for comparing the desired and actual values of the operating parameter to provide an error signal, and processing means for processing the error signal to provide an actuating signal to control the actuator thereby moving the hitch so as to tend to reduce the error signal to zero, the system being characterized in that the actuator is controlled by a solenoid-operated fluid-flow control valve in an electrical control circuit including a primary semiconductor which is rendered conductive in response to the actuating signal to activate the valve, said electrical control circuit including means for checking the potential drop across the primary semiconductor when the semiconductor is rendered conductive in order to detect any short circuit between the semiconductor and the valve, means for maintaining the semiconductor conductive whilst the actuating signal is applied and the potential drop indicates no short and for turning the semiconductor off if the potential drop indicates a short between the semiconductor and the valve.

10. A control system according to claim 9 characterized in that the signal to activate the valve is fed to one input of a logic gate and this signal is used to generate an initial short duration second input for the logic gate which causes the gate to provide an output which is used to switch the primary semiconductor between its conductive and non-conductive states, the system being arranged to continue to generate the necessary second input to the logic gate to maintain the primary semiconductor conductive for as long as the signal is applied provided no short circuit is detected.

11. A control system according to claim 7 characterized in that the primary semiconductor comprises a field effect transistor.

12. A control system according to claim 7 characterized in that a pulse width modulation means (PWM) is used for controlling the signal to the valve by oscillating the signal "on" and "off", the potential drop across the primary semiconductor being checked at the commencement of each "on" period of the pulse width modulation means to detect any short circuit before the semiconductor is damaged.

* * * * *